United States Patent
Sharma et al.

(10) Patent No.: US 9,679,271 B2
(45) Date of Patent: Jun. 13, 2017

(54) SYSTEM AND METHOD FOR PRODUCT DELIVERY

(71) Applicant: Humana Inc., Louisville, KY (US)

(72) Inventors: Prateek Sharma, Scottsdale, AZ (US); Sean Guthrie, Phoenix, AZ (US); Toan Trinh, Phoenix, AZ (US); Atin Kapadia, Chandler, AZ (US); Michael Mahar, Phoenix, AZ (US)

(73) Assignee: Humana Inc., Louisville, KY (US)

( * ) Notice: Subject to any disclaimer, the term of this patent is extended or adjusted under 35 U.S.C. 154(b) by 0 days.

(21) Appl. No.: 15/391,988

(22) Filed: Dec. 28, 2016

(65) Prior Publication Data

US 2017/0109691 A1    Apr. 20, 2017

Related U.S. Application Data

(63) Continuation of application No. 15/069,597, filed on Mar. 14, 2016, now abandoned, which is a continuation-in-part of application No. 14/067,639, filed on Oct. 30, 2013, now Pat. No. 9,286,593.

(60) Provisional application No. 61/720,071, filed on Oct. 30, 2012.

(51) Int. Cl.
*G06F 7/00*    (2006.01)
*G06Q 10/08*    (2012.01)

(52) U.S. Cl.
CPC .................... *G06Q 10/087* (2013.01)

(58) Field of Classification Search
USPC ........................................... 700/227
See application file for complete search history.

(56) References Cited

U.S. PATENT DOCUMENTS

| | | | | |
|---|---|---|---|---|
| 5,771,657 A | * | 6/1998 | Lasher | B65B 61/20 53/131.4 |
| 2003/0093181 A1 | * | 5/2003 | Rosenblum | G06F 19/3462 700/232 |
| 2004/0123567 A1 | * | 7/2004 | McErlean | B65B 5/103 53/445 |
| 2012/0029692 A1 | * | 2/2012 | Owen | G01V 8/20 700/240 |
| 2012/0073241 A1 | * | 3/2012 | Mahar | G01G 19/4148 53/55 |
| 2012/0232693 A1 | * | 9/2012 | Allinson | G07F 17/0092 700/237 |
| 2013/0105035 A1 | * | 5/2013 | Henriques | B65B 19/34 141/1 |

* cited by examiner

*Primary Examiner* — Kyle Logan
(74) *Attorney, Agent, or Firm* — Standley Law Group LLP

(57) ABSTRACT

A system and method for delivering a product such as a pharmacy bottle from a conveyor system to a delivery container via a delivery chute. A sensor is placed at a top opening of the chute to sense for product in the chute area and to provide instructions to complete the delivery order if the chute area is clear.

29 Claims, 4 Drawing Sheets

SYSTEM AND METHOD FOR PRODUCT DELIVERY

This application is a continuation of U.S. application Ser. No. 15/069,597, filed on Mar. 14, 2016, which is a continuation-in-part of U.S. application Ser. No. 14/067,639, filed on Oct. 30, 2013 and issued as U.S. Pat. No. 9,286,593 on Mar. 15, 2016, which claims the benefit of U.S. Provisional Patent Application No. 61/720,071, filed on Oct. 30, 2012, all of which are hereby incorporated by reference as if fully recited herein.

BACKGROUND AND SUMMARY OF THE INVENTION

Exemplary embodiments of the present invention relate generally to a system and method for product, order or container delivery. While an exemplary embodiment may be particularly useful for transporting at least one vial order or container to a desired destination, other types of products not limited to vial orders or containers may be delivered via an exemplary system and method.

An exemplary embodiment may be particularly useful for the delivery of pharmacy orders or containers. A pharmacy vial or bottle is one example of a pharmacy order or container. Nevertheless, other types of delivery systems may also benefit from exemplary embodiments of the present invention.

In a known delivery system for pharmacy containers, the production rate and efficiency is hampered by manual operations. For example, a human operator may be required to pick a pharmacy product or container from a conveyor one at a time and then manually process it for packing. The picked product or container is then manually scanned before being added to a package (e.g., a delivery bag or box). After the package is filled in this manner, the operator then seals the package. This process is inefficient and susceptible to operator error in selecting the wrong container. Accordingly, there is a need for an improved delivery system and method that improves efficiency and production rates. A need also exists for an improved delivery system and method that minimizes operator error.

An exemplary embodiment may satisfy some or all of the aforementioned needs. An exemplary embodiment may comprise a chute in association with a conveyor. The chute is adapted to receive product from the conveyor. The chute is then adapted to transfer the product to a packing system such as a delivery bag or box. Accordingly, an exemplary embodiment may also include a packing system adapted to receive product from the chute. Another exemplary embodiment includes a related method for delivery. In an exemplary embodiment, the method comprises conveying a product on a conveyor; and transferring the product from the conveyor to a chute. The method may further comprise the step of delivering the product to a packing system via the chute. As such, an exemplary embodiment may improve efficiency and production rates and also limit or eliminate operator error.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Exemplary embodiments of the present invention are directed to a system and method for delivering a product. Exemplary embodiments are particularly useful for delivering a pharmacy bottle, which may also be known as a vial. An order having multiple bottles can be delivered together via the system. The multiple bottles may be delivered in a delivery container such a bag, box or carton. However, other exemplary embodiments may be useful for delivering different types of products unless clearly set forth otherwise.

Figure 1:
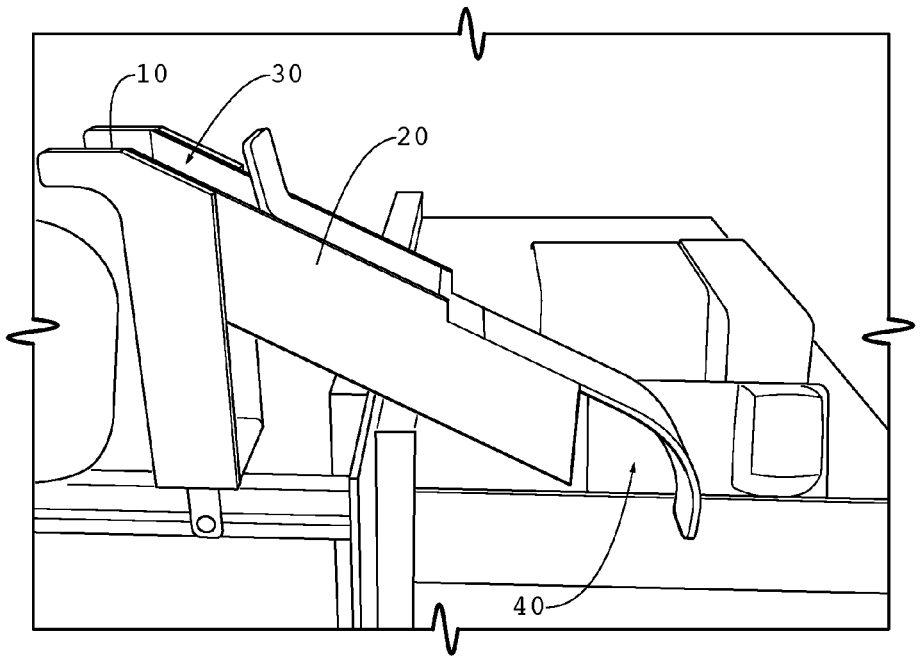
FIG. 1 is a perspective view of an exemplary embodiment of a system of the present invention.

FIG. 1 shows an example of a system for delivering a product such as a pharmacy bottle or order. In this exemplary embodiment, the system is comprised of conveyor 10 that is in association with a chute 20. Conveyor 10 is adapted to convey at least one product to the chute. The product is preferably held at the top of the chute area (e.g., held via a latch mechanism shown generally at 30) until the system is ready to release the product down the chute and into the bag (or other delivery component such as a box) below. Once the vials are released, the chute 20 is then adapted to deliver the product(s) to a bag located at the bottom 40 of the chute.

In an exemplary embodiment, chute 20 is substantially perpendicularly connected to conveyor 10. In other words, the direction of travel of conveyor 10 is substantially perpendicular to the direction of travel of chute 20 in such embodiments. In other embodiments, chute 20 may be connected to conveyor 10 at any suitable angle and in any suitable manner.

Figure 2:
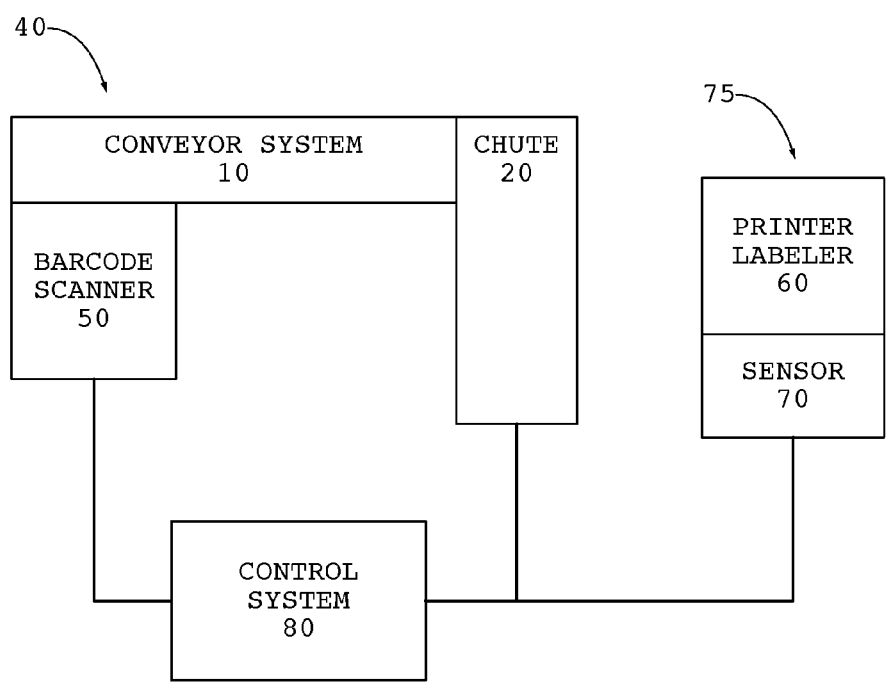
FIG. 2 is a block diagram of one embodiment of the delivery system of the present invention.

FIG. 2 illustrates one embodiment of the delivery system 40 of the present invention. In the preferred embodiment, as the product is riding along the conveyor system towards the delivery chute, the product is scanned (preferably via a barcode reader 50 place on the conveyor system). The details of the product scanned (for example, order number, order contents, packaging and/or delivery instructions) are then stored in the system and preferably transmitted to a control system 80 and a processing station 75 where the chute is located. The processing system preferably includes a printer or labeler 60 for printing out documents associated with the product being delivered on the conveyor system. For example, because the product has been scanned as it travels along the conveyor system, the processing station knows that the product is about to arrive at the chute delivery location and that associated paperwork (e.g., prescription information and instructions, and delivery information) can be printed out for placement into the delivery bag or box located at the bottom of the chute.

In one embodiment, there is a sensor 70 (e.g., infrared) located at the printer location that senses when the paper documents associated with the product order has been picked up for placement into the delivery bag or box. Upon sensing this occurrence, the system is programmed to release the product (e.g., vial order) so that it may be delivered by the chute to the delivery bag or box located at the bottom of the chute. Once the product, and associated documentation, has been placed into the delivery bag or box, the worker at the location can manually seal the package for delivery to the intended customer. The system then knows that this delivery order has been completed and updates the system.

An exemplary embodiment of a delivery system may further include a packing system adapted to receive a product from chute 20. Accordingly, an exemplary embodiment of the packing system may comprise the aforementioned package, which is adapted to receive product from chute 20. An exemplary embodiment of a packing system may also be adapted to communicate with conveyor 10 and/or chute 20.

As a result of the chute in association with the conveyor, greater automation of a delivery and packing process may be achieved. In one exemplary embodiment, conveyor 10 may be connected to chute 20 such that chute 20 is adapted to automatically deliver the product to the package or packing system. Other exemplary embodiments may offer greater automation as compared to a typical packing operation that requires an operator to manually pick a product from the conveyor and place it in a package.

In an exemplary embodiment, conveyor 10 is adapted to group a predetermined number of the product at a predetermined location until the predetermined number of the product are ready to be released to the chute 20. For example, a plurality of the product may be grouped at a predetermined location until a signal is received to release the group to chute 20. However, in some embodiments, a conveyor may be adapted to sequentially deliver a single product to the chute.

In an exemplary embodiment, conveyor 10 is adapted to receive at least one signal from the control system, which indicates that the predetermined number of the product are ready to be released to chute 20. In one example, the control system may be adapted to send a signal to conveyor 10 when the delivery bag or box is in place to receive the product and the operator has placed that associated order paperwork in the package. In such example, the control system may automatically send the signal to conveyor 10 when the delivery bag or box is ready. Alternatively, an operator may initiate the sending of the signal by the control system to the conveyor 10 when the delivery bag or box is ready to receive the product.

After conveyor 10 delivers the product to chute 20, an example of chute 20 may be adapted to transfer the product (e.g., the aforementioned predetermined number of the product or a single product) to a position above an opening of the delivery bag or box. From this position, each product may be automatically or manually scanned before being added to the delivery bag or box. The product may be released to the delivery bag or box singly or as a group. An example of chute 20 may include scanning capability, or an example of the system may include an automatic or manual system for scanning product released from the chute. Thereafter, in an exemplary embodiment, an operator may initiate sealing or closing of the delivery bag or box once the necessary product has been placed therein. In an alternative embodiment, the packing system may automatically seal or close the delivery bag or box once full.

In other exemplary embodiments, the chute may be adapted to deliver the product to the delivery bag or box without stopping the product. In such an embodiment, the product may be automatically or manually scanned before entering the chute, or the product may be automatically scanned while traveling through the chute.

Figure 3:
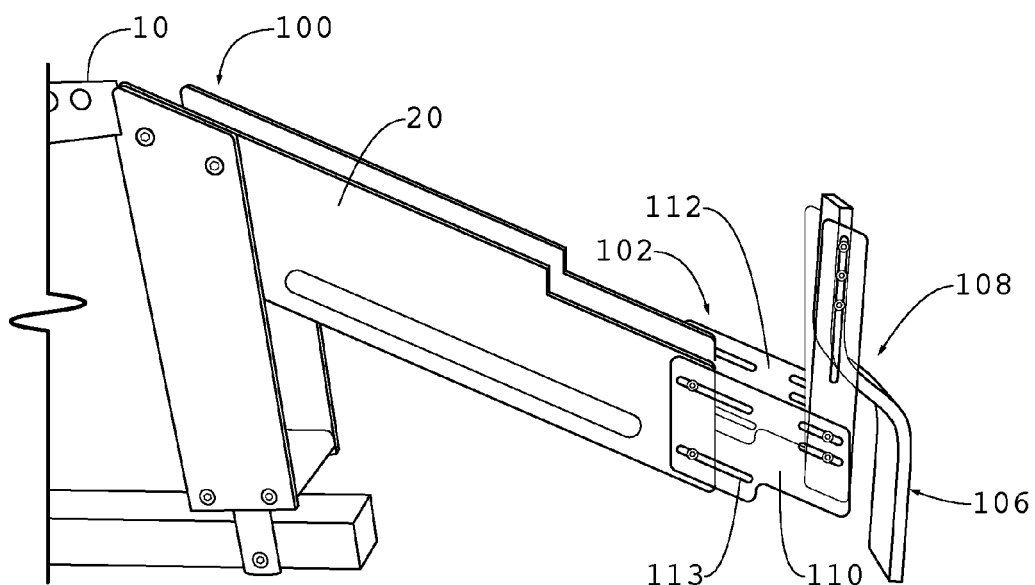
FIG. 3 is another embodiment of the chute system of the present invention without a roof portion.

FIG. 3 illustrates an embodiment of the chute system of the present invention without a roof portion. Instead, the top is open. Removing the roof helps to keep bottles from jamming and reducing the risk of orders getting into the wrong groups. Removing the roof helps to prevent the vials from getting stuck between the conveyor and the chute and jamming. With the roof removed, operators can spot vial jams right away and fix the problem faster because visibility is much greater. The absence of a roof further removes another obstacle that was likely to cause a jam. Opening the chute accommodates erratic vial behavior, eliminating jams and still sends the correct vials into the correct containers.

Figure 4:
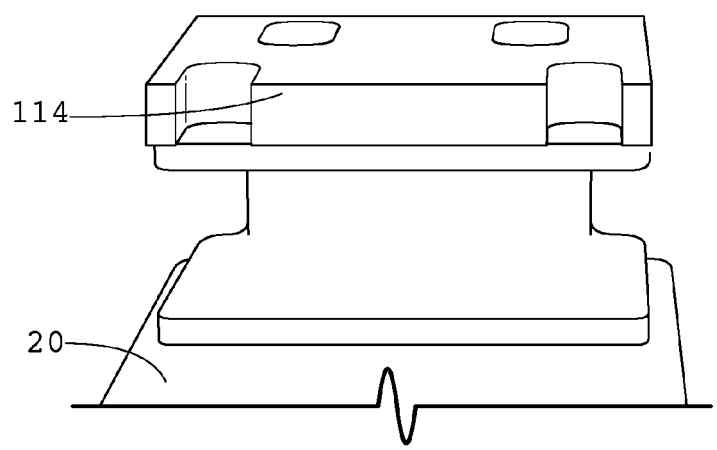
FIG. 4 is one embodiment of the photo eye sensor base.
Figure 5:
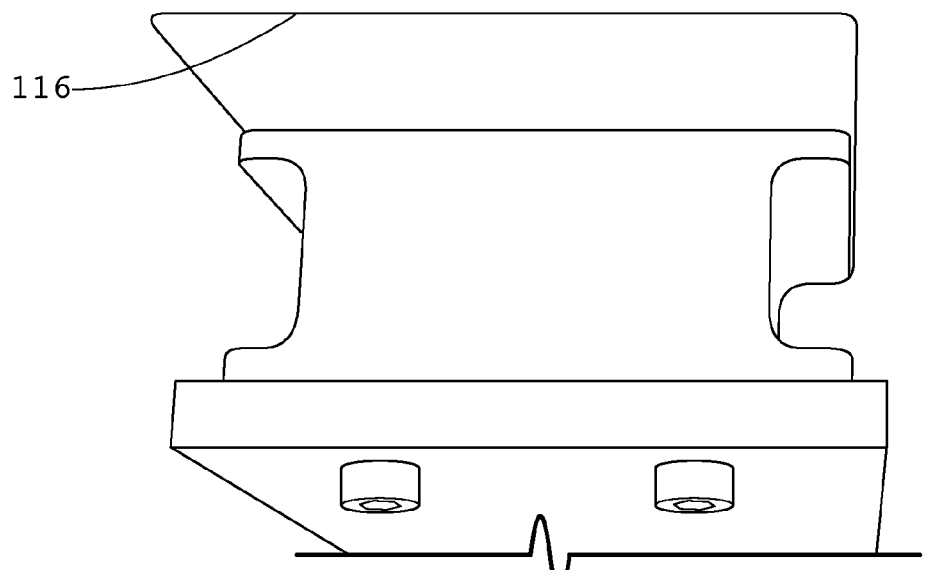
FIG. 5 is a side view of the photo eye sensor base of FIG. 4.
Figure 6:
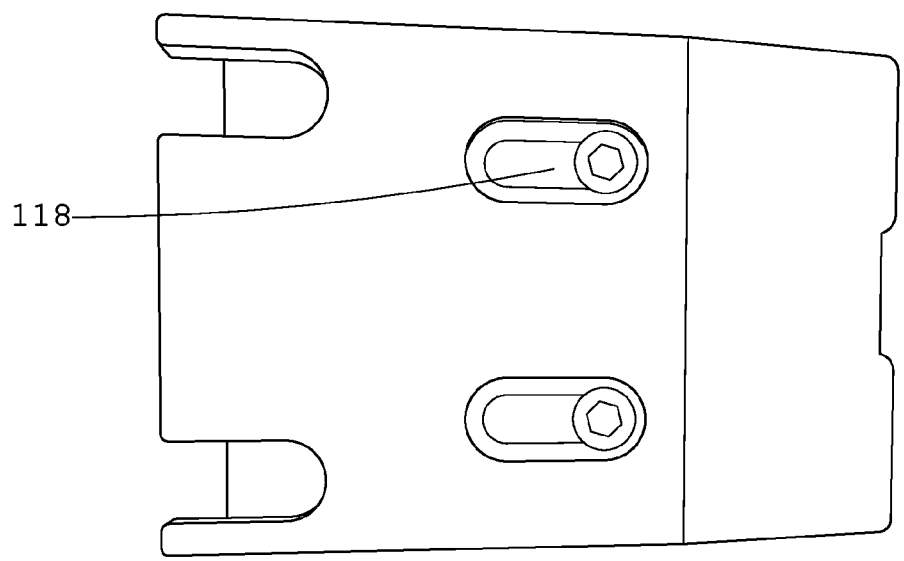
FIG. 6 is a is a top view of the photo eye sensor base of FIG. 4.
Figure 7:
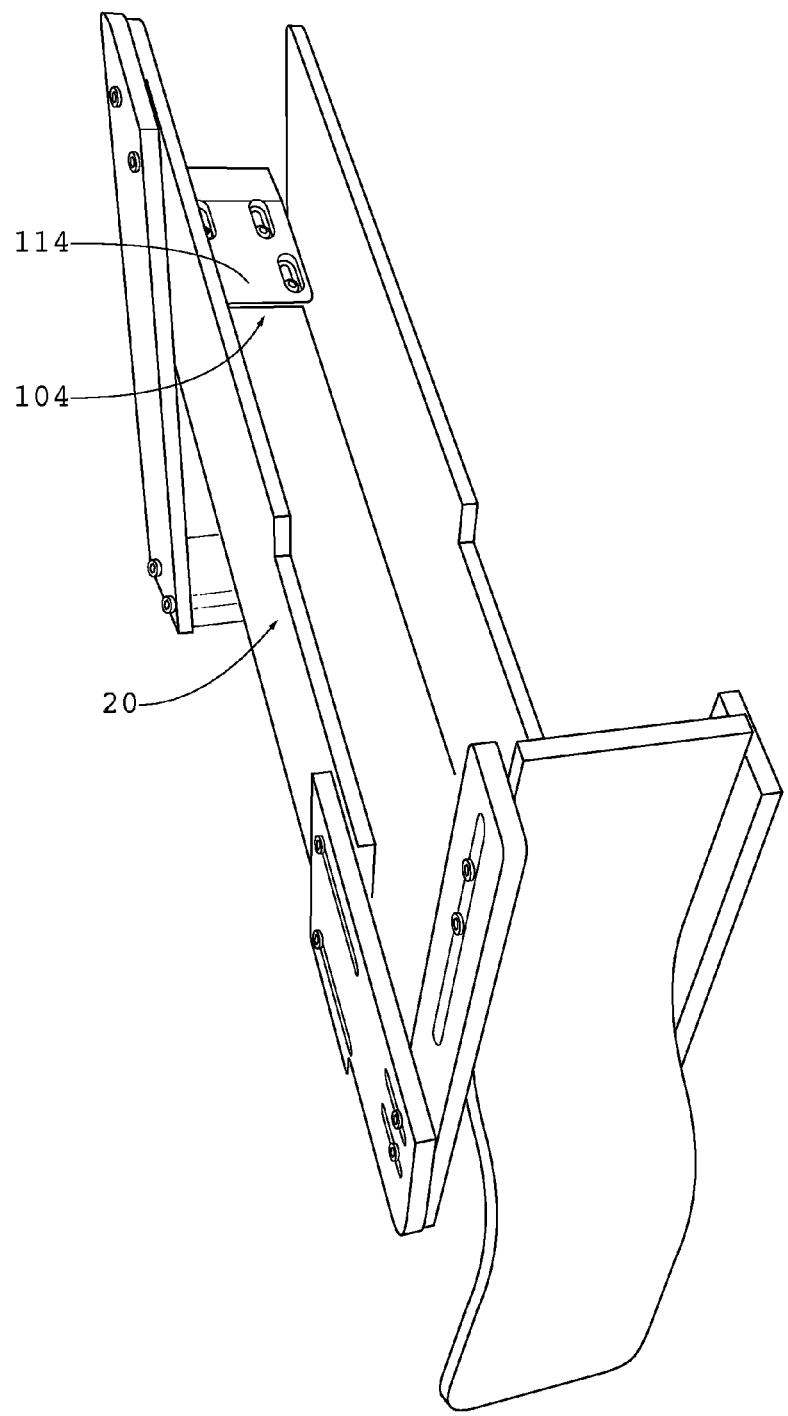
FIG. 7 illustrates one embodiment of the sensor placed at the chute opening.

FIG. 4 is one embodiment of the photo eye sensor base (looking up the chute with no sensor installed). FIG. 5 is a side view of the photo eye sensor base of FIG. 4 (looking into the top opening of the chute). FIG. 6 is a is a top view of the photo eye sensor base of FIG. 4; FIG. 7 illustrates another angle of one embodiment of the sensor placed at the chute opening (showing the sensor generally at 104 and a vial coming down the conveyor entering the chute opening).

In one embodiment of the invention, the delivery system is comprised of: a conveyor adapted to convey a product; a chute adapted to receive the product from the conveyor, and wherein the chute has a top opening 100 for receiving the product from the conveyor and a bottom opening 102; wherein the chute is adapted to deliver the product to a delivery container; a scanner located on the conveyor for scanning the product as it passes on the conveyor; a sensor 104 attached at the top opening of the chute configured to point down the length of the chute for detecting for the presence of the product; a processing system in communication with the control system, the processing system programmed with one or more software routines executing on the processing system to: 1) receive product information about the product; 2) to receive data from the sensor; and 3) provide instructions to complete the delivery order if the chute area is clear.

In one embodiment, the delivery system is configured with an end portion 106 placed near the bottom opening of the chute for guiding the product coming out of the chute into the delivery bag or box. The end portion preferably has a curved portion 108 towards its top portion for ensuring the product moves down into the delivery bag or box. This allows the accommodation of different vial behaviors—standing, falling, actively rotating, etc.—while still guiding the vials to their containers without incident. The location (e.g., height) of the rounded curve is placed so it does not interfere with these behaviors. The overall openness lets the operator see into the device, ensuring the absence of jams. In this embodiment, nothing obstructs the vial's fall, so it can behave in any manner along the chute while avoiding jams.

The rounded curve of the end portion located at the bottom of the chute allows enough clearance for vials to act as erratically as necessary without hitting the curve and jamming. The curve is placed and configured to drive the bottle downward regardless of a vial's behavior. In other words, it accommodates more unruly, unexpected activity and still pushes the vial down. This helps to remove hang-up points for the vials.

In one embodiment, the delivery system has a first adjustable bracket 110 attached to a first side of the chute at the bottom opening of the chute and a second adjustable bracket 112 attached to the second side of the chute at the bottom opening of the chute, the first and second adjustable brackets having slots 113 for allowing adjustment of the chute opening. A user can adjust how far the first and second adjustable brackets extend out from the bottom opening of the chute. In the preferred embodiment, the end portion is adjustably attached to the first and second adjustable brackets and wherein a user can adjust the height of the end portion. The slots allow maintenance personnel to adjust height as well as distance outward. The slide portion allows up-and-down movement so the operator can maintain more fine control of where the vial comes out and hits the container. In one embodiment of the chute is made of black ABS (acrylonitrile butadiene styrene) while the brackets are comprised of clear acrylic.

In one embodiment of the invention, the sensor is housed in a sensor base 114 attached to chute, and wherein the sensor base has a top plate 116 for guiding the product as it comes off the conveyor into the chute. In the preferred embodiment, the top plate is adjustable to move along the top of the sensor base. The sensor base preferably has adjustable slots 118 for engaging fastener means that allow the sensor base to be adjusted to accommodate sensor range. The sensor base is adapted to be adjusted so that it can be moved closer or farther away from the top opening of the chute. In one embodiment of the invention, the chute has an open top to allow visibility of the product moving through the chute.

In the preferred embodiment, the sensor points down toward the brackets to make sure the chute is clear. In one embodiment, the sensor is a common "photo eye." It is mounted on a 3D-printed base that also serves as a mechanism to smoothly transition vials from the conveyor onto the chute. The sensor base also can be adjusted to accommodate the photo eye's sensor range. In other words, it can move closer to or farther away from the end of the chute as needed. As such, this piece of equipment could be considered either part of the controls system or the processing system. In other words, in one embodiment, it is the same sensor system that carries the signal from the printer noting documents have been removed, as well as the same system that receives the signal from the vial chute sensor to know whether the area is clear. (If the area is not clear, the sensor will not allow the bag to be sealed.) The entire photo eye sensor base is preferably adjustable via a movable bar that's bolted onto the conveyor frame. Note that each chute on the conveyor line can be a different size because of all of the different configurations on the line itself. Each chute is preferably adjustable to accommodate those variations on the conveyor line.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A delivery system comprising:
   a conveyor adapted to convey a product;
   a chute having an open top to allow visibility of the product moving through the chute and wherein the chute is adapted to receive the product from the conveyor, and wherein the chute has a top opening for receiving the product from the conveyor and a bottom opening;
   wherein the chute is adapted to deliver the product to a delivery container;
   a scanner located on the conveyor for scanning the product as it passes on the conveyor;
   a control system for communicating with the scanner for obtaining information about the product;
   a printer;
   a release mechanism located at the top opening of the chute for holding the product at the opening until the system is ready to release the product into the chute for delivery;
   a sensor attached at the top opening of the chute configured to point down the length of the chute for detecting for the presence of the product;
   a processing system in communication with the control system and the printer, the processing system programmed with one or more software routines executing on the processing system to: 1) receive product information about the product; 2) instruct the printer to print out documents having product information about the product; 3) instruct the delivery system to release the product into the chute for delivery; 4) update the delivery system when the product has been released for delivery; 5) receive data from the sensor and to provide instructions to complete the delivery order if the chute area is clear.

2. The delivery system of claim 1 wherein the product is a pharmacy bottle.

3. The delivery system of claim 1 wherein the chute is adapted to automatically deliver the product to the delivery container.

4. The delivery system of claim 1 wherein the conveyor is adapted to group a predetermined number of the product at a predetermined location until the predetermined number of the product are ready to be released to the chute.

5. The delivery system of claim 4 wherein the delivery system is adapted to receive at least one signal from the control system indicating that the predetermined number of the product are ready to be released to the chute.

6. The delivery system of claim 4 wherein the chute is adapted to transfer the predetermined number of the product to a position above an opening of the delivery container.

7. The delivery system of claim 6 wherein the chute is adapted to release the predetermined number of the product into the delivery container.

8. A delivery system comprising:
   a conveyor adapted to convey a product;
   a chute adapted to receive the product from the conveyor, and wherein the chute has a top opening for receiving the product from the conveyor and a bottom opening;
   a release mechanism located at the top opening of the chute for holding the product at the opening until the system is ready to release the product into the chute for delivery;
   wherein the chute is adapted to deliver the product to a delivery container;
   a scanner located on the conveyor for scanning the product as it passes on the conveyor;
   a control system for communicating with the scanner for obtaining information about the product;

a sensor attached in the chute at the top opening of the chute configured to point down the length of the chute for detecting for the presence of the product;

a processing system in communication with the control system, the processing system programmed with one or more software routines executing on the processing system to: 1) receive product information about the product; 2) to receive data from the sensor; and 3) provide instructions to complete the delivery order if the chute area is clear.

9. A delivery system according to claim 8, further comprising an end portion placed near the bottom opening of the chute for guiding the product coming out of the chute into the delivery container.

10. A delivery system according to claim 9, wherein the end portion has a curved portion towards the top portion for ensuring the product moves down into the delivery container.

11. A delivery system according to claim 9, having a first adjustable bracket attached to a first side of the chute at the bottom opening of the chute and a second adjustable bracket attached to the second side of the chute at the bottom opening of the chute, the first and second adjustable brackets having slots for allowing adjustment of the chute opening.

12. A delivery system according to claim 11, wherein a user can adjust how far the first and second adjustable brackets extend out from the bottom opening of the chute.

13. A delivery system according to claim 11, wherein the end portion is adjustably attached to the first and second adjustable brackets and wherein a user can adjust the height of the end portion.

14. A delivery system according to claim 8, wherein the sensor is housed in a sensor base attached to chute, and wherein the sensor base has a top plate for guiding the product as it comes off the conveyor into the chute.

15. A delivery system according to claim 14, wherein the sensor base has adjustable slots adapted to allow the sensor base to be adjustable to accommodate sensor range.

16. A delivery system according to claim 15, wherein the sensor base is adapted to be adjusted so that it can be moved closer or farther away from the top opening of the chute.

17. A delivery system according to claim 8, wherein the chute has an open top to allow visibility of the product moving through the chute.

18. A delivery system comprising:
a conveyor adapted to convey a product;
a chute adapted to receive the product from the conveyor, and wherein the chute has a top opening for receiving the product from the conveyor and a bottom opening; wherein the chute is adapted to deliver the product to a delivery container;
a scanner located on the conveyor for scanning the product as it passes on the conveyor;
a sensor attached at the top opening of the chute configured to point down the length of the chute for detecting for the presence of the product;
a processing system in communication with the control system, the processing system programmed with one or more software routines executing on the processing system to: 1) receive product information about the product; 2) to receive data from the sensor; and 3) provide instructions to complete the delivery order if the chute area is clear.

19. A delivery system according to claim 18, further comprising a control system for communicating with the scanner for obtaining information about the product.

20. A delivery system according to claim 18, further comprising an end portion placed near the bottom opening of the chute for guiding the product coming out of the chute into the delivery container.

21. A delivery system according to claim 20, wherein the end portion has a curved portion towards its top portion for ensuring the product moves down into the delivery container.

22. A delivery system according to claim 20, having a first adjustable bracket attached to a first side of the chute at the bottom opening of the chute and a second adjustable bracket attached to the second side of the chute at the bottom opening of the chute, the first and second adjustable brackets having slots for allowing adjustment of the first and second adjustable brackets.

23. A delivery system according to claim 22, wherein a user can adjust how far the first and second adjustable brackets extend out from the bottom opening of the chute.

24. A delivery system according to claim 22, wherein the end portion is adjustably attached to the first and second adjustable brackets and wherein a user can adjust the height of the end portion.

25. A delivery system according to claim 18, wherein the sensor is housed in a sensor base attached to chute, and wherein the sensor base has a top plate for guiding the product as it comes off the conveyor into the chute.

26. A delivery system according to claim 25, where the top plate is adjustable to move along the top of the sensor base.

27. A delivery system according to claim 25, wherein the sensor base has adjustable slots adapted to allow the sensor base to be adjusted to accommodate sensor range.

28. A delivery system according to claim 27, wherein the sensor base is adapted to be adjusted so that it can be moved closer or farther away from the top opening of the chute.

29. A delivery system according to claim 18, wherein the chute has an open top to allow visibility of the product moving through the chute.

* * * * *